United States Patent [19]

Kato et al.

[11] Patent Number: 4,834,222
[45] Date of Patent: May 30, 1989

[54] HYDRAULIC DAMPER

[75] Inventors: Tetuo Kato; Seiji Toda, both of Kanagawa; Tsutomu Suzuki, Tokyo, all of Japan

[73] Assignee: Tokico Ltd., Kanagawa, Japan

[21] Appl. No.: 132,558

[22] Filed: Dec. 14, 1987

[30] Foreign Application Priority Data

Dec. 13, 1986 [JP] Japan .................. 61-192003[U]

[51] Int. Cl.$^4$ .............................. F16F 9/49; F16F 9/34
[52] U.S. Cl. ................................. 188/280; 188/282; 188/322.14; 188/322.15; 188/322.22
[58] Field of Search .............. 188/280, 322.15, 322.14, 188/322.13, 322.22, 281, 282, 275, 317, 319, 322.5; 137/493, 625.31, 512.15, 493.8

[56] References Cited

U.S. PATENT DOCUMENTS

| | | | |
|---|---|---|---|
| 3,991,862 | 11/1976 | Tanabe | 188/282 |
| 4,034,860 | 7/1977 | Leppich | 188/282 |
| 4,113,072 | 9/1978 | Palmer | 188/282 |
| 4,114,735 | 9/1978 | Kato | 188/282 |
| 4,191,281 | 3/1980 | Nishikawa et al. | 188/319 |
| 4,203,507 | 5/1980 | Tomita et al. | 188/317 |
| 4,512,447 | 4/1985 | Miura | 188/322.15 |
| 4,561,524 | 12/1985 | Mizumukai et al. | 188/322.15 X |
| 4,610,332 | 9/1986 | Mourray | 188/280 X |
| 4,635,765 | 1/1987 | Schmidt | 188/322.13 X |
| 4,721,130 | 1/1988 | Hayashi | 188/322.14 X |

FOREIGN PATENT DOCUMENTS

| | | |
|---|---|---|
| 28608 | 6/1964 | Fed. Rep. of Germany . |
| 0163843 | 9/1983 | Japan .................. 188/280 |
| 60-16031 | 2/1985 | Japan . |
| 60129442 | 7/1985 | Japan . |
| 0180035 | 8/1986 | Japan .................. 188/280 |

OTHER PUBLICATIONS

Abstract, Japanese, 6—129442, published, Jul. 10, 1985, entitled "Valve Structure of Oil Damper", Tatsuya Takagi.

Primary Examiner—Douglas C. Butler
Attorney, Agent, or Firm—Wenderoth, Lind & Ponack

[57] ABSTRACT

A hydraulic damper has a valve mechanism adapted to generate a damping force during extension and contraction strokes of the damper. The valve mechanism includes a disc valve assembly consisting of a main disc valve for generating a damping force and an orifice for generating a damping force in low operation speed region of the damper. The orifce is provided with an additional disc valve for controlling the damping force generated.

1 Claim, 4 Drawing Sheets

HYDRAULIC DAMPER

Background of the Invention

The present invention relates to a dual tube type hydraulic damper for use in a vehicle such as an automobile.

Referring to FIG. 1, a typically dual tube type hydraylic damper will be described.

Conventionally, a dual tube type hydraulic damper 1 is fabricated with a double structure such as that shown in FIG. 1. An outer tube 2 is closed at the upper and lower ends thereof by an upper cap 3 and a lower cap 4, respectively, and receives an inner tube or cylinder 5 therein. A piston 8 is reciprocatingly and slidably disposed in the cylinder 5 and divides the interior of the cylinder 5 into an upper oil chamber 6 and a lower oil chamber 7. One end of a piston rod 9 is connected to the piston in the cylinder 5 and the other end of the piston rod 9 projects from the cylinger 5 by extending through the upper oil chamber 6 and the upper cap 3. The cylinder is provided at its upper end with a rod guide 10 which serves to guide the piston rod 9. The upper cap 3 accommodates a seal member 11 for sealing the interior of the cylinder. The chamber 6 and 7 are filled with oil, and a reservoir 12 defined by an annular space between the outer tube 2 and the cylinder 5 contains oil in the lower portion thereof and pressurized gas in the upper portion thereof. Valve mechanisms 14 and 15 for generating a damping force are mounted on the piston 8 and bottom portion 13 of the cylinder 5, respectively.

Next, a general description explanation will be made, by referring to FIG. 2, of a prior art valve mechanism of this type adapted to generate a damping force and mounted on the piston 8 and the bottom portion 13 of cylinder 5. Since the valve mechanism 15 mounted on the bottom portion 13 is, however, generally similar to the one provided on the piston 8 with respect to its structure and operation, only the mechanism 14 provided on the piston 8 will be explained in detail, an explanation of the valve mechanism 15 provided on the bottom portion 13 being omitted for the sake of brevity.

Normally, a valve mechanism 14 of this kind generally comprises a disc valve assembly 16 consisting of a plurality of flexible disc valves which overlap each other, a valve seat 17 on which the disc valve assembly 16 is adapted to be seated, a valve retainer 18 for supporting the disc valve assembly 16, and a spring 19 for biasing the disc valve assembly 16 toward the valve seat 17 through the valve retainer 18.

Two disc valves 21 and 22 portioned at the lowest part of the disc valve assembly 16, as viewed in FIG. 2, are arranged to define an orifice 25, which will be explained in detail hereinafter, and are dissimilar to the other disc valves of the disc valve assembly 16 with respect to their configuration. As shown in FIG. 3, the upper disc valve 21 of the two disc valves has a plurality of U-shaped cutouts 21a extending from the outer periphery thereof toward the center thereof. The lower disc valve 22 has an annular shape.

As shown in FIG. 2, the upper disc valve 21 having the U-shape cutouts 21a overlies the lower disc valve 22, and a plurality of disc valves 23 (four disc valves in this prior art device) in turn, overlie, the upper disc valve 21. Thus, the orifice 25 which places the upper oil chamber 6 in communication with the lower oil chamber 7 is formed by the space between the lower disc valve 22 and a disc valve 23a which is the lowest of the disc valves 23 directly overlying the upper disc valve 21. An opening 26 formed between the lower disc valve 22 and the disc valve 23a along a portion of the outer periphery thereof, namely an entrance to the U-shaped cutout 21a, defines an opening of the orifice 25. The orifice opening 26 has a predetermined, fixed area which is determined by the thickness of the upper disc valve 21, the configuration of the U-shaped cutout 21a and so on. The upper and lower disc valves and the plurality of disc valves 23 together constitute a main valve 24 which will be explained hereinafter.

The operation of the valve mechanism 14 described above will be explained.

The valve mechanism 14 provided on the piston 8 is one that is adapted to generate a damping force when the hydraulic damper 1 is extended. When the hydraulic damper 1 is extended, oil in the upper oil chamber 6 of the cylinder 5 flows into the lower oil chamber 7 through the valve mechanism 14. During this extension stroke of the hydraulic damper 1, a damping force is generated by the throttle operation of the orifice 25 when the speed of piston 8 is slow (low operating speed region), while the damping force is generated by the main valve 24, the inner circumferential portion of which is bent downwardly as viewed in FIG. 2, when the speed of the piston 8 is high (high operating speed region).

A characteristic curve of the damping force described above is shown in FIG. 4. When the operating speed of the damper 1 is relatively low, the damping force as a function of piston speed is represented by a quadratic curve designated by reference symbol $a_1$ since the damping force is only generated by the orifice 25. When the operating speed of the damper 1 is relatively high, the damping force as a function of piston speed is represented by a straight line designated by reference symbol $a_2$ since the pressure exerted on the main valve 24 is relatively high and the inner circumferential portion of the main valve is bent downwardly as viewed in FIG. 2.

When the damper 1 is contracted, oil in the lower oil chamber 7 flows into the upper oil chamber 6. During this contracting stroke, however, no flow resistance is generated by the valve mechanism 14 mounted on the piston 8, since the disc valve assembly 16 is separated from the valve seat 17 against the spring force generated by the spring 19.

The valve mechanism 15 mounted on the bottom portion 13 of the cylinder 5 is one that is adapted to generate a damping force when the damper 1 is contracted, and the structure and operation thereof are generally similar to those of the valve mechanism 14 mounted on the piston 8 that has been described above. The damping force characteristics curve of the valve mechanism 15 is also shown in FIG. 4 and designated by reference symbols $b_1$ and $b_2$. In a low operating speed region the damping force generated as a function of piston speed as represented by a quadratic curve $b_1$, while the same is represented by a straight line $b_2$ in a high operating speed region.

Though oil in the reservoir 12 flows into the lower oil chamber 7 when the damper 1 is extended, no flow resistance is generated by the valve mechanism 15 mounted on the bottom portion 13 since the disc valve assembly thereof is separated from the valve seat.

As described above, the hydraulic damper 1 is able to generate a damping force during both the extension and the contraction strokes.

The following problems are experienced with the prior art hydraulic damper described above.

A hydraulic damper for use in an automobile is employed in order to soften shocks imparted by the road surface so as to ensure a comfortable ride, and the damper also aims to improve the durability of the body of the automobile as well as to improve the condition of contact between the tires and the road surface so as to improve the operating characteristics and stability of the automobile. In these circumstances, therefore, it is necessary to design the damping force characteristics of the hydraulic damper according to the weight, steering characteristics of the automobile, and so on. Although the damping force characteristic for a high operating speed region can be designed in accordance with a particular model of car by utilizing an appropriate number of the valves that constitute the disc valve assembly and/or by selecting a spring having suitable spring characteristics, the damping force for a low operating speed region cannot be since the damping force is generated only by an orifice defined in the manner described hereinbefore. Namely, in order to design the damper to provide a suitable damping force generated by the orifice 25, the opening area of the orifice openings 26 must be changed. The damping force generated by an orifice such as orifice 25 is a function represented by a quadratic curve as shown in FIG. 4. Therefore, if the opening area is changed, there is some apprehension that the damping force may change to an extreme extent as the operating speed of the damper changes in a low operating speed region, as shown by the dotted line in FIG. 4, and thus adversely affect the riding comfort and the durability of the body.

Summary of the Invention

The present invention has been accomplished in view of the problems described above and the object of the invention is to provide a hydraulic damper wherein damping force characteristics can be controlled for the low operating speed region, namely for the region in which a damping force is generated by an orifice.

To solve this problem and to accomplish the object mentioned above, this invention provides a hydraulic damper comprising a valve mechanism for generating a damping force during the extension and contraction strokes of the damper, the valve mechanism including a disc valve assembly consisting of a main disc valve means for generating a damping force and an orifice means for generating a damping force in a low operating speed region of the damper, characterized in that the orifice means is provided with an additional disc valve for controlling the damping force generated by the orifice means.

In a hydraulic damper according to the present invention, a damping force is generated by an orifice through which oil flows in a low operating speed region in which the operating speed of the damper is low. At that time, an additional disc valve gradually opens to generate a damping force as the oil flow speed increases.

In the low operating speed region, therefore, two kinds of damping forces are simultaneously generated by the orifice and the additional disc valve, and the damping force characteristics in the low operating speed area are determined by these two kinds of damping forces.

It is therefore possible to establish desired damping force characteristics in a low operating speed region by selecting an additional disc valve having an appropriate spring constant and the spring force.

Brief Description of the Drawings

Many other objects, features and advantages of the present invention will become apparent to those skilled in the art upon making reference to the detailed description which follows and the accompanying drawings in which.

Detailed Description of the Preferred Embodiments

Figure 1:
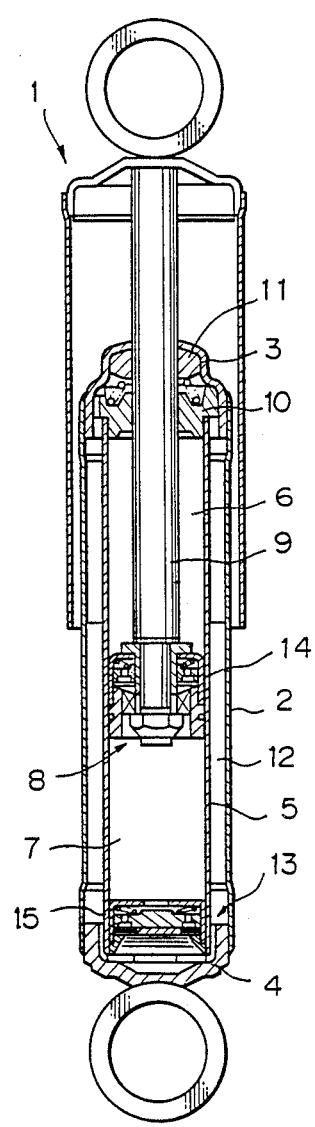
FIG. 1 is a vertical sectional view showing a typical prior art dual tube type hydraulic damper.

Referring now to the drawings, preferred embodiments of the present invention will be described. Elements similar or corresponding to ones in the prior art described hereinbefore will referred to with the same reference numerals and a detailed explanation thereof will be omitted. Since the structure and operation of a hydraulic damper according to the present invention may be similar to those of the prior art shown in FIG. 1 except for the valve mechanism, the valve mechanism alone will be described below.

Figure 2:
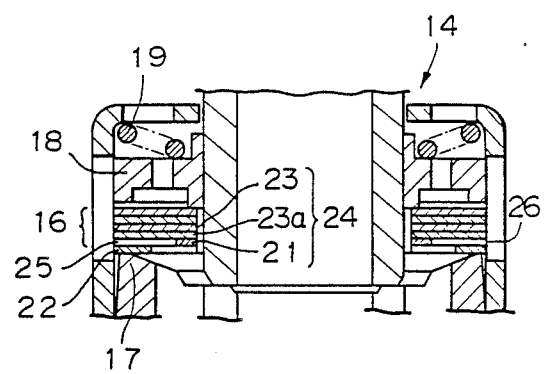
FIG. 2 is a vertical sectional view showing a prior art valve mechanism mounted on a piston.
Figure 3:
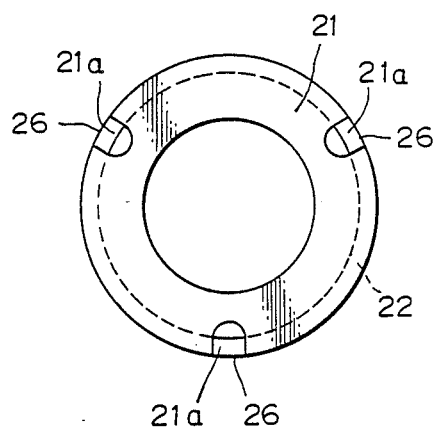
FIG. 3 is a plan view showing an upper and a lower disc valve that overlap each other and that define an orifice provided in the valve mechanism shown in FIG. 2.
Figure 5:
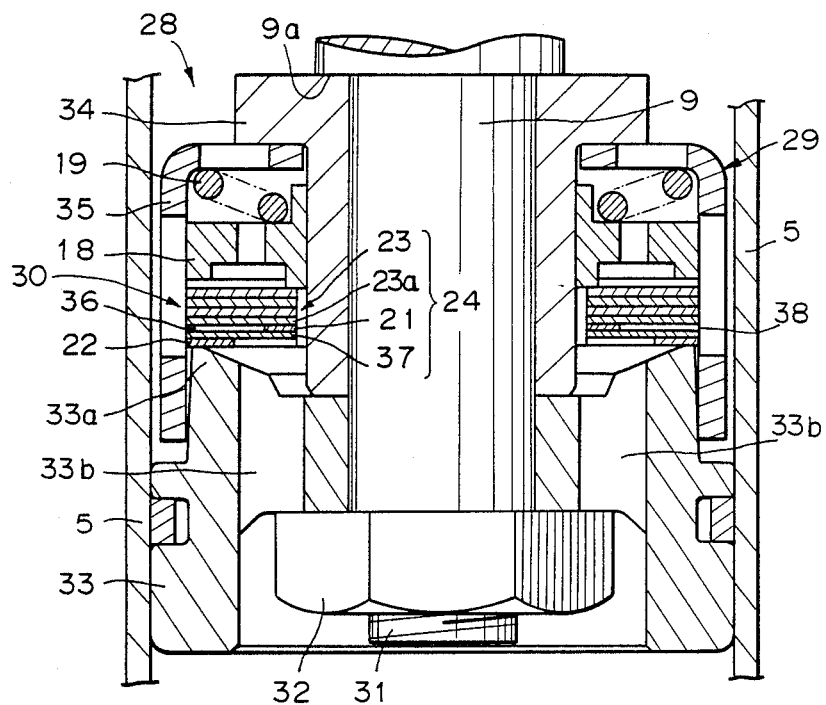
FIG. 5 is a vertical sectional view showing a first embodiment of the present invention applied to a valve mechanism mounted on a piston.

FIG. 5 shows a first embodiment of the valve mechanism according to the invention. Shown at 28 is a piston, on which a valve mechanism 29 is mounted. The piston 28 is fixedly mounted on one end of a pistom rod 9 by a nut 32 which is screwed on a threaded portion 31 of the piston rod 9. A piston body 33 of the piston 28 is provided with a valve seat 33a formed on the upper outer periphery portion thereof and has a plurality of through-holes 33b extending therein in an axial direction. A spacer 34 is disposed between a stepped portion 9a of the piston rod 9 and the piston body 33 and supports a valve guide 35 that extends around the outer periphery of the piston body 33. Inside the valve guide 35 is disposed a valve retainer 18 which is adapted to slide along the outer peripheral surface of the spacer 34 and along the inner peripheral surface of the valve guide 35, and the valve retainer 18 is downwardly biased by a spring member 19. Between the valve retainer 18 and the valve seat 33a of the valve body 33 is disposed a disc valve assembly 30 consisting of a plurality of flexible disc valves that overlap each other. Two disc valves 21 and 22 which may have a configuration identical to that of the upper and lower disc valves 21 and 22 employed in the prior art shown in FIGS. 2 and 3 are employed to define an orifice in the present embodiment. The upper disc valve 21 is provided with a plurality of U-shaped cutouts 21a extending from the outer periphery thereof toward a central portion thereof. The lowere disc valve 22 has an annular configuration. On the upper disc valve 21 are provided a plurality of disc valves 23 which are superposed in the same manner as in the prior art shown in FIG. 2. Although the orifice opening 26 in the prior art shown in FIG. 2 is defined by an opening formed between the lower disc valve 22 and the lowest disc valve 23a of the disc valves 23 which directly overlie the upper disc 22, in the present embodiment an additional disc valve 37 is disposed between the upper disc valve 21 and the lower disc valve 22. An orifice 36 is, therefore, formed between the additional disc valve 37 and the lowest disc valve 23a and an orifice opening 38 is defined by an opening formed between the additional disc valve 37 and the lowest disc valve 23a along a portion of the outer periphery thereof. As shown in FIG. 5, the inner circumferential portion of the additional disc valve 37 overlaps the inner circumferential portion of the upper disc valve 21. The end of the orifice 36 opposite to the orifice opening 38 is, therefore, closed during the non-operational state of the damper. During operation of the damper, however, the inner circumferential portion of the additional disc valve 37 is deflected downwardly as viewed in FIG. 5 by the pressure applied thereon, so that the opposite end of the orifice 36 is opened and the upper and lower oil chambers of the damper are allowed to communicate through the orifice 36. The orifice opening has a pedetermined, fixed area. The lower disc valve 22 acts to back the additional disc valve.

In the valve mechanism described above, in a low operating speed region during an extension stroke of the damper, a damping force is generated not only by the orifice 36 but also by the additional disc valve 37 disposed between the upper and lower disc valves 21, 22. The deflection of the additional disc valve 37 increases as the pressure applied on the disc valve 37 becomes greater.

Figure 4:
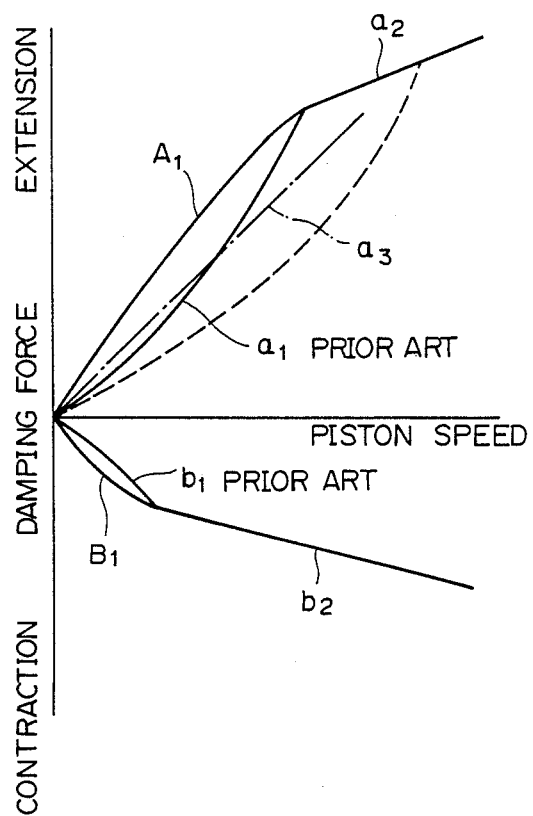
FIG. 4 is a graph showing damping force characteristics of the hydraulic dampers according to a prior art device and the present invention, respectively.

In this way, the total damping force generated by the valve mechanism 29 is the sum of the two damping forces generated by the orifice 36 and the additional disc valve 37, respectively, and the characteristics thereof are represented by the curve designated by reference symbol $A_1$ in FIG. 4. When the operating speed of the damper increases, a main disc valve 24 consisting of the upper and lower disc valves, the additional valve 37 and the plurality of disc valves 23 is bent to generate damping force, the characteristics of which are shown by the straight line $a_2$ in FIG. 4.

In this embodiment, the additional disc valve 37 is located on the downstream side of the orifice 36. Therefore, the amount of pressure applied on the additional disc valve 37 is small since the oil flow from the upper oil chamber to the lower oil chamber is once throttled by the orifice 36. This results in a small degree of deflection of the additional disc valve 37 and thus ensures that it enjoys a long life.

Although in the first embodiment the lowest disc valve 23a directly overlies the upper disc valve 21, an annular spacer and another additional disc valve may be disposed between the lowest disc valve 23a and the upper disc valve 21 in such a manner as to constitute a main valve and an orifice located separately from each other.

Figure 6:
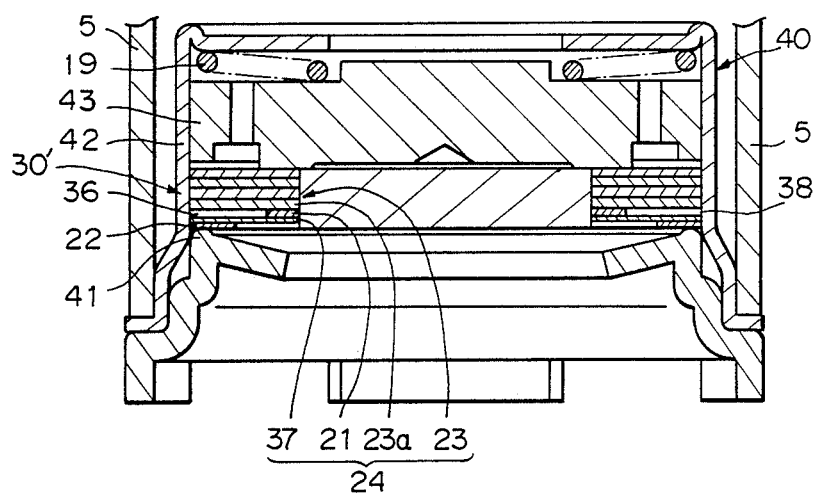
FIG. 6 is a vertical sectional view showing a second embodiment of the present invention applied to a valve mechanism mounted on a bottom portion of cylinder.

FIG. 6 shows a second embodiment in which a valve mechanism 40 is provided on a bottom portion 13 of a hydraulic damper. The valve mechanism 40, the structure of which is generally similar to that of the valve mechanism 29 in the first embodiment, comprises a bottom valve seat 41, a valve guide 42, a valve retainer 43 disposed within the valve guide 42 and biased toward the bottom valve seat 41 by a spring member 19, and a disc valve assembly 30' consisting of a plurality of disc valves disposed between the valve retainer 43 and the valve seat 41. The disc valve assembly 30' is similar to the valve assembly 30 in the first embodiment Namely, an additional disc valve 37 is disposed between upper and lower disc valves 21, 22 and four disc valves 23 overlie the upper disc valve 21. In the same manner as in the first embodiment, an orifice 36 and an orifice opening 38 are defined. Since the operation of this valve mechanism 40 is similar to that of the valve mechanism 29 in the first embodiment, a detailed explanation thereof is omitted.

According to the embodiment the damping force characteristics shown by a curve designated by $B_1$ and a straight line designated by $b_2$ in FIG. 4 are obtained in a low operating speed region and in a high operating speed region of the damper, respectively.

Figure 7:
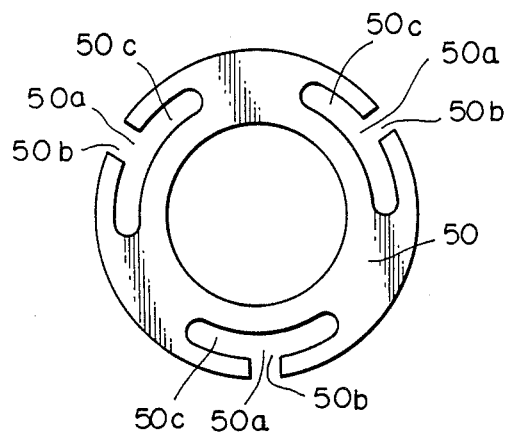
FIG. 7 is a plan view of a disc valve employed in a third embodiment of the invention.

Next, a third embodiment of the present invention will be described. In this embodiment, an upper disc valve 50 shown in FIG. 7 is employed instead of the upper disc valve 21 in the first and second embodiments. The remaining disc valves are the same type as those in the first and second embodiments. As shown in FIG. 7, the upper disc valve 50 has a plurality of cutouts 50a, each of which consists of a first cutout 50b extending from the outer periphery of the disc valve 50 toward the center thereof and a second cutout 50b and extending circumferentially from the inner end of the first cutout 50b.

By employing this disc valve 50 as an upper disc valve disposed between the upper disc valve 50 and a lower disc valve is larger than if the conventional disc valve 21 is employed. This results in the fact that variation in the valve of the damping force generated is smaller. A valve mechanism which includes the upper disc valve 50 described above can be employed in valve mechanisms of both a piston and a bottom portion of a cylinder.

Figure 8:
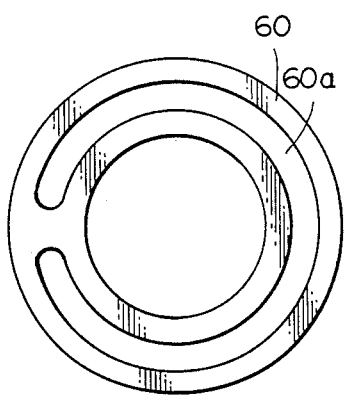
FIG. 8 is a plan view of a disc valve employed in a fourth embodiment of the invention.
Figure 9:
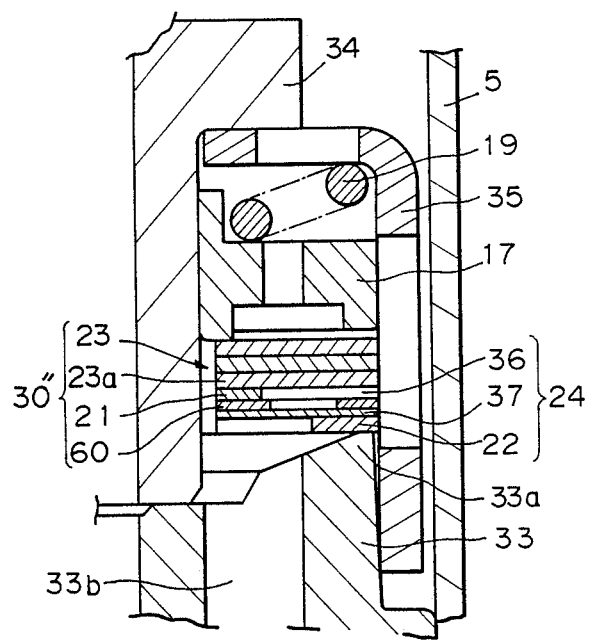
FIG. 9 is a vertical sectional view showing a valve mechanism mounted on a piston provided with the disc valve shown in FIG. 8.

Next, a fourth embodiment of the invention will be described. In this embodiment, a second additional disc valve 60 is also employed. As shown in FIG. 8, the disc valve 60 is provided with a circumferentially extending slot 60a. As shown in FIG. 9, the disc valve 60 is disposed between an upper disc valve 21 and a first additional disc valve 37. Therefore, oil flows through U-shaped cutouts 21a of the upper disc valve 21 and the slot 28a and then onto the first additional disc valve 37. In this embodiment, the pressure receiving area of the first additional disc valve 37 also is larger, and this results in the fact that the variation in the valve of the damping force generated is smaller.

A valve mechanism according to the present embodiment as described above can also be employed in valve mechanisms of both a piston and a bottom portion of a cylinder.

As described hereinbefore, a hydraulic damper according to the present invention includes an additional disc valve in addition to an orifice. By changing the spring constant and spring force of the additional disc valve, the damping force generated in a low operating speed region can therefore be changed. As a result, it is possible to provide a hydraulic damper with desired force characteristics in accordance with the model of automobile in which it is to be employed.

What is claimed is:

1. In a hydraulic damper in which a fluid passage is defined through which fluid flows during extension and contraction strokes of the hydraulic damper, the improvement comprising:

a valve mechanism disposed within said damper for generating a damping force during one of said strokes of the damper, said valve mechanism including a main disc valve through which fluid in the damper flows during said one of the strokes of the damper, and a valve retaining means mounted in the damper for supporting said main disc valve in a first position and for allowing said maim disc valve to be displaced in its entirety to a second position from said first position during the other of said strokes of the damper, said main disc valve being disposed across the fluid passage when it is in said first position, and the fluid passage being in an open state, in which no resistance to the flow of fluid therethrough is offered by the main disc valve, when the main disc valve is in said second position, said main disc valve having an orifice defined therein, and a disc adjacent said orifice at the downstream side thereof with respect to the direction in which the fluid flows therethrough during said one of the strokes of the damper, said disc maintained in a closed position at which said disc closes said orifice when no fluid is urged through said orifice, and said disc of said main disc valve being deflectable from said closed position to an open position at which said disc opens said orifice under the pressure of the fluid flowing through the fluid passage during said one of the strokes of the damper and while the speed at which said one of the strokes occurs is below a predetermined value to generate the damping force.

* * * * *